United States Patent
Iijima et al.

(10) Patent No.: US 9,926,142 B2
(45) Date of Patent: Mar. 27, 2018

(54) WORKPIECE SUPPLYING DEVICE, PICKING DEVICE, TIMEPIECE ASSEMBLING APPARATUS, AND PICKING METHOD

(71) Applicant: Seiko Epson Corporation, Tokyo (JP)

(72) Inventors: Shiguma Iijima, Suwa (JP); Tsuguya Kojima, Chino (JP); Takuma Okamuro, Fujimi (JP); Takahiro Sakamoto, Hokuto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/205,303

(22) Filed: Jul. 8, 2016

(65) Prior Publication Data

US 2017/0008703 A1     Jan. 12, 2017

(30) Foreign Application Priority Data

Jul. 10, 2015 (JP) ................................ 2015-138481

(51) Int. Cl.
| | |
|---|---|
| *B65G 47/14* | (2006.01) |
| *B65G 47/24* | (2006.01) |
| *B65G 43/08* | (2006.01) |
| *B65G 27/04* | (2006.01) |
| *B65G 27/02* | (2006.01) |

(52) U.S. Cl.
CPC ............. *B65G 43/08* (2013.01); *B65G 27/02* (2013.01); *B65G 27/04* (2013.01); *B65G 47/1421* (2013.01); *B65G 2812/0392* (2013.01)

(58) Field of Classification Search
CPC B65G 47/14; B65G 47/1421; B65G 47/1492; B65G 47/24

USPC .......... 198/339.1, 345.1, 391, 395, 401, 409
See application file for complete search history.

(56) References Cited

U.S. PATENT DOCUMENTS

| | | | | |
|---|---|---|---|---|
| 3,893,266 | A * | 7/1975 | Anderson | B24B 31/073 451/327 |
| 4,186,478 | A * | 2/1980 | Hamane | H02K 15/068 29/564.1 |
| 5,664,322 | A * | 9/1997 | Best | B23P 21/004 221/297 |
| 7,303,195 | B2 * | 12/2007 | Nie | B23B 31/103 269/309 |

(Continued)

FOREIGN PATENT DOCUMENTS

| | | |
|---|---|---|
| JP | 2008-105811 A | 5/2008 |
| JP | 2010-105081 A | 5/2010 |

(Continued)

OTHER PUBLICATIONS

US Patent Application Publication US 2002/0195474 A1, Tsuyuki et al. Dec. 26, 2002.*

*Primary Examiner* — Douglas A Hess
(74) *Attorney, Agent, or Firm* — Harness, Dickey & Pierce, P.L.C.

(57) ABSTRACT

A workpiece supplying device includes a pallet that has a groove portion being disposed in an arc state and a stepped portion including a stepped surface intersecting a circumferential direction of the pallet and accommodates a workpiece, and a vibration unit that drives the pallet due to vibration and transports the workpiece in the circumferential direction toward the stepped portion. A plurality of the groove portions are disposed in a concentric manner.

15 Claims, 8 Drawing Sheets (56) References Cited

U.S. PATENT DOCUMENTS 7,490,710 B1 * 2/2009 Weskamp ............ B23Q 7/1426
　　　　　　　　　　　　　　　　　　　　　198/345.3
8,746,669 B2 * 6/2014 Takanami ......... H01L 21/67132
　　　　　　　　　　　　　　　　　　　　　269/309

FOREIGN PATENT DOCUMENTS

JP　　2011-000685 A　　1/2011
JP　　2012-197122 A　　10/2012

* cited by examiner

WORKPIECE SUPPLYING DEVICE, PICKING DEVICE, TIMEPIECE ASSEMBLING APPARATUS, AND PICKING METHOD

BACKGROUND

1. Technical Field

The present invention relates to a workpiece supplying device, a picking device, a timepiece assembling apparatus, and a picking method.

2. Related Art

In the related art, in a manufacturing line in which mechanical assembly work of products is performed, a plurality of manufacturing processes are included, components necessary for each manufacturing process are supplied, and each of the supplied components is grasped by a robot or the like through image recognition or the like and is moved to a necessary position, thereby being assembled.

JP-A-2010-105081 discloses a bottle picking device in which the bottom surface of a pallet accommodating workpieces and four wall surfaces of the pallet are divided, the bottom surface of the pallet and the wall surfaces of the pallet can relatively move upward/downward, and the heights of the wall surfaces of the pallet are changed in accordance with the heights of the workpieces inside the pallet.

However, in the bottle picking device disclosed in JP-A-2010-105081, in a case of piled workpieces, the workpieces overlap each other. Therefore, even though three-dimensional image recognition is performed, there is a problem in that it is difficult to accurately recognize the position and the posture of the workpiece. In addition, a chuck structure or an operation of picking up the workpiece is complicated, thereby leading to a problem in that it is difficult to accurately pick up the workpiece. Accordingly, there is a problem in that a cycle time of assembling is elongated.

Generally, regarding the shape of a workpiece, for example, in a case of supplying or picking up plate-shaped workpieces which are inevitably turned upside down or workpieces including a protrusion on the outer surface of the workpiece and having a shape in which the workpiece tilts when being placed on a plane surface (that is, in an unstable state) as well, similar to the above-referenced problem, it is difficult to accurately recognize the position and the posture of the workpiece, thereby leading to a problem in that it takes time to perform picking-up, an error occurs in picking-up, and the like.

Therefore, there have been demands of a workpiece supplying device which supplies workpieces such that the postures thereof are in desired postures, a picking device which accurately picks up the supplied workpieces, a timepiece assembling apparatus, and a picking method.

SUMMARY

An advantage of some aspects of the invention is to solve at least a part of the problems described above, and the invention can be implemented as the following forms or application examples.

Application Example 1

A workpiece supplying device according to this application example includes: a pallet that has a groove portion being disposed in an arc state and a stepped portion including a stepped surface intersecting a circumferential direction and accommodates a workpiece; and a vibration unit that applies vibration to the pallet.

According to the workpiece supplying device, for example, in a case where the shape of the workpiece is a shape in which a protrusion (projection portion) or the like is present on an outer surface and the workpiece tilts when being placed on a plane surface, the protrusion which is a factor causing the tilt is guided into the groove portion disposed on the front surface of the pallet in an arc state. Therefore, the workpiece can be supplied such that the posture thereof becomes a desired posture. The workpiece which is not guided into the groove portion (the workpiece which is not in the desired posture) is caused to fall from the stepped portion having the stepped surface intersecting the circumferential direction of the pallet. Thus, it is possible to improve the probability of being in the desired posture by causing the position of the workpiece to be transported so as to deviate from that in the previous transportation, turning the workpiece upside down, and the like. The workpiece caused to fall is caused to pass through a cycle again by being transported on the front surface of the pallet toward the stepped portion.

Application Example 2

In the workpiece supplying device according to the application example, it is preferable that a plurality of the groove portions are disposed in a concentric manner.

According to the workpiece supplying device with this configuration, for example, the number of the workpieces in the desired postures can be efficiently increased with respect to the workpieces having the shapes in which the workpiece tilts when being placed on a plane surface due to the plurality of groove portions disposed in a concentric manner. When the number of the workpieces guided into the groove portions increases, separation of the workpieces from the groove portion caused by mutual collision of the workpieces, and the like is reduced. Thus, stable transportation can be conducted.

Application Example 3

In the workpiece supplying device according to the application example, it is preferable that the pallet includes a surface portion orthogonal to a central axis of the pallet.

According to the workpiece supplying device with this configuration, the workpiece is picked up in a case where the workpiece which is guided into the groove portion and is in the desired posture is positioned in a surface portion orthogonal to the central axis of the pallet, for example. Therefore, compared to a case where picking-up is performed in the surface portion intersecting the central axis in an inclined manner, the workpiece can be accurately picked up in a stable posture.

Application Example 4

In the workpiece supplying device according to the application example, it is preferable that the pallet includes a portion having light-transmitting characteristics.

According to the workpiece supplying device with this configuration, for example, when the workpiece is positioned on a side of the pallet above a portion having light-transmitting characteristics and irradiation of light is performed from a side thereof below the portion having light-transmitting characteristics, there are cases where the light is entirely transmitted, and there are cases where the light is blocked by the workpiece. Accordingly, the position (shape) or the posture of the workpiece can be clarified.

Application Example 5

In the workpiece supplying device according to the application example, it is preferable that the portion having light-transmitting characteristics includes a synthetic resin or glass.

According to the workpiece supplying device with this configuration, the pallet is configured to include a synthetic resin material having light-transmitting characteristics or a glass material having light-transmitting characteristics. Thus, the portion having light-transmitting characteristics can be easily formed.

Application Example 6

A picking device according to this application example includes: any one of the above-described workpiece supplying devices; a detection unit that detects a position and a posture of a workpiece inside a pallet; a pickup unit that picks up the workpiece; and a control unit that outputs an instruction causing the pickup unit to pick up the workpiece, based on a detection result from the detection unit.

According to the picking device, with respect to the workpieces supplied by the workpiece supplying device, the workpiece can be easily and accurately picked up by the pickup unit due to the detection of the position and the posture of the workpiece performed by the detection unit, and the instruction issued to the pickup unit by the control unit based on the detection result of the detection unit.

Application Example 7

In the picking device according to the application example, it is preferable that a lighting portion that irradiates the pallet with light while being provided on a rear surface side of the pallet opposite to a surface on which the groove portion is disposed.

According to the picking device with this configuration, when the lighting portion included on the rear surface side of the pallet irradiates the pallet with light, the light can be transmitted through the portion of the pallet having light-transmitting characteristics. Accordingly, since the contrast between the workpiece and the surroundings can be improved, for example, in a case where the detection unit includes the image-capturing unit which acquires image data of the workpiece, image-capturing can be performed with a high contrast, and detection of the position and the posture of the workpiece can be more accurately performed.

Application Example 8

A timepiece assembling apparatus according to this application example includes: any one of the above-described picking devices; and a transportation unit that transports an assembling object component in which a workpiece picked up by the picking device is embedded.

According to the timepiece assembling apparatus, a timepiece can be accurately assembled, and thus, improvement of the cycle time can be realized.

Application Example 9

A picking method according to this application example includes: preparing a workpiece which has a projection portion and a workpiece supplying device which includes a pallet accommodating the workpiece, a groove portion being disposed on a front surface side of the pallet in an arc state, a stepped portion having a stepped surface intersecting a circumferential direction of the pallet, and a vibration unit applying vibration to the pallet; transporting the workpiece by using the workpiece supplying device; detecting the workpiece which is transported in the transportation process, by using a detection unit; and picking up the workpiece which is detected in the detection process, by using a pickup unit.

According to the picking method, the groove portions of the workpiece supplying device are set to have the pitch within a range from one time to two times the maximum dimensions of the outer shape of the workpiece including the projection portion which is guided into the groove portion. Accordingly, in the transportation process of the workpiece supplying device, even in a case where the projection portions of the workpieces are respectively guided into the groove portion and an adjacent groove portion, transportation in which the workpiece and the different workpiece overlap each other is reduced as much as possible. Moreover, separation of the workpieces from the groove portion caused by mutual collision of the workpieces, and the like is reduced. Thus, stable transportation can be conducted. In addition, it is possible to perform efficient transportation without generating useless space. In the detection process of the picking device, with respect to the workpiece which is efficiently transported, the position and the posture of the workpiece can be more accurately detected by the detection unit. In the pickup process of the picking device, with respect to the workpiece which is detected, picking-up can be easily and accurately performed by the pickup unit. Therefore, the cycle time can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment will be described based on the drawings.

Embodiment

Figure 1:
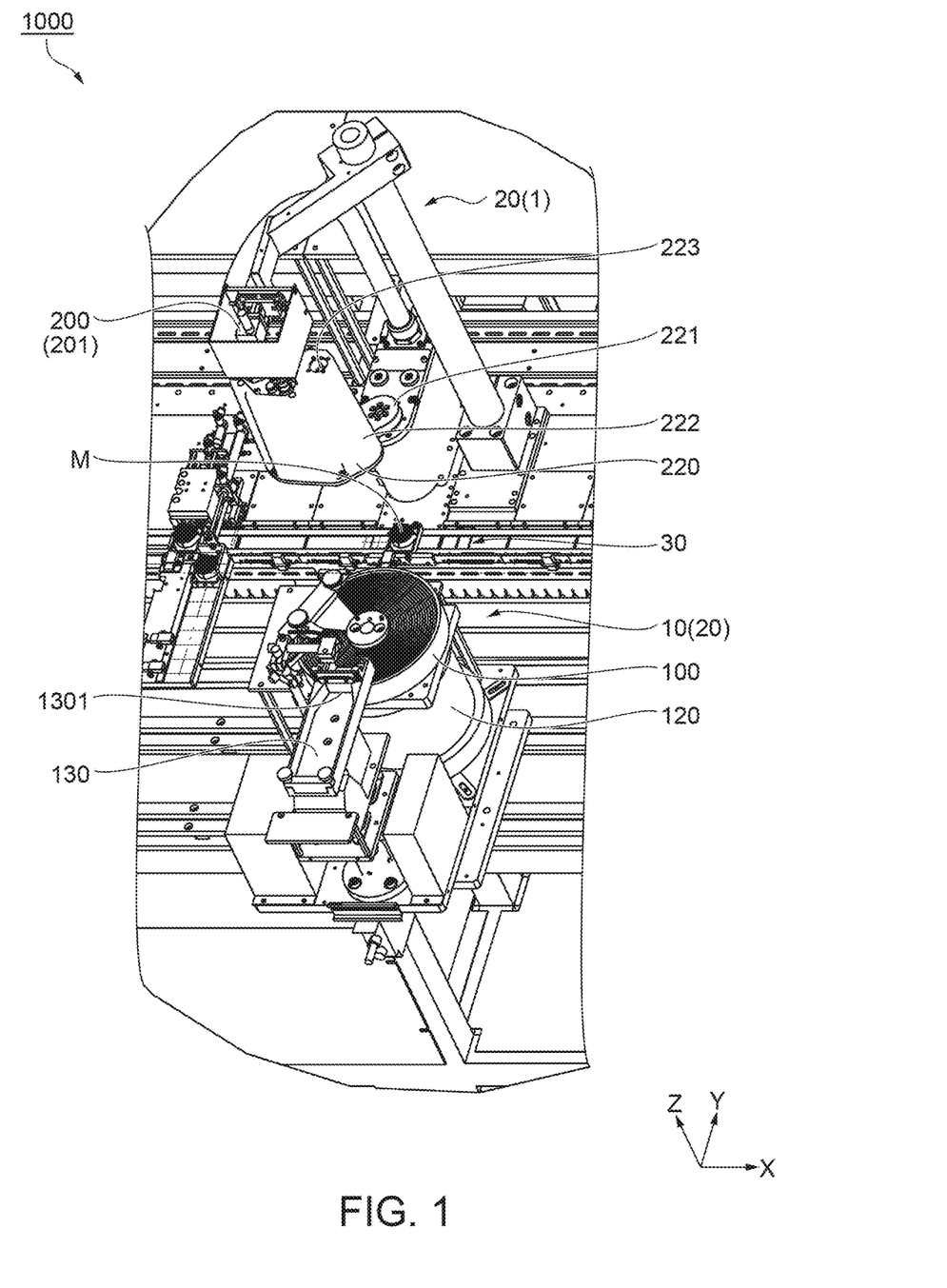
FIG. 1 is a perspective view illustrating a timepiece assembling apparatus of the present embodiment.
Figure 2:
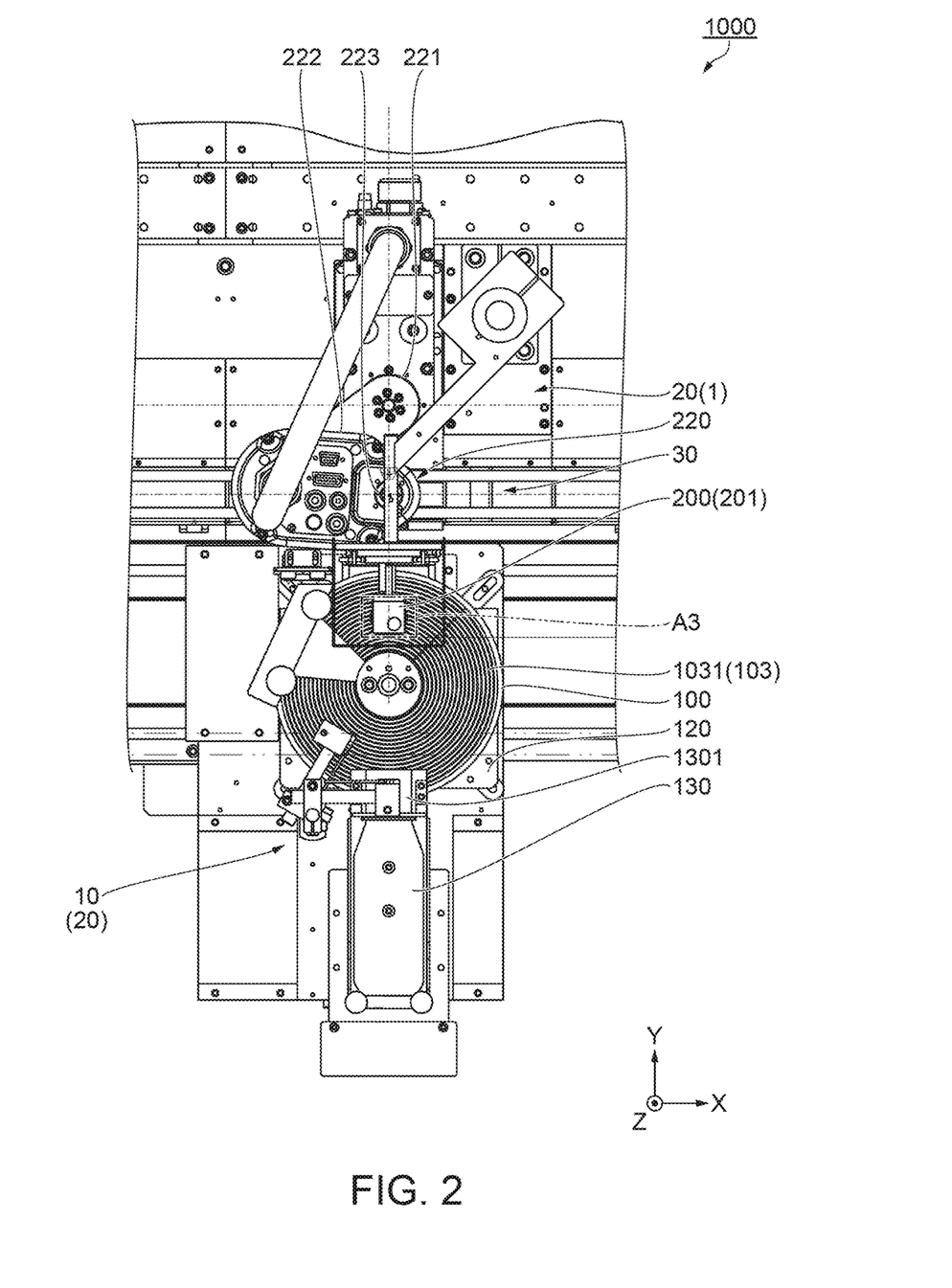
FIG. 2 is a plan view of the timepiece assembling apparatus viewed from above.

FIG. 1 is a perspective view illustrating a timepiece assembling apparatus 1 of the present embodiment. FIG. 2 is a plan view of the timepiece assembling apparatus 1 viewed from above. With reference to FIGS. 1 and 2, a configuration of the timepiece assembling apparatus 1 will be schematically described.

The timepiece assembling apparatus 1 of the present embodiment is set as an apparatus that carries out one of manufacturing processes (assembly processes) in a manufacturing line (timepiece assembly line 1000) in which mechanical assembly work of timepieces including a plurality of manufacturing processes is performed. The timepiece assembling apparatus 1 supplies a workpiece W of the timepiece (FIG. 8) necessary for the process thereof and repeatedly executes operations in which the supplied workpiece W is grasped by a pickup unit 220 through image recognition and is moved to a necessary position.

For the convenience of description, the drawings describing the present embodiment are illustrated while adopting the XYZ-orthogonal coordinate system. Specifically, in FIG. 1, the direction from the left side to the right side in the sheet (conveyance direction of the timepiece assembly line 1000) is referred to as an X-axis direction (positive X-direct ion). The direction from the hand-side to the outside in the sheet while being orthogonal to the X-axis direction is referred to as a Y-axis direction (positive Y-direction). The direction from the lower side to the upper side in the sheet while orthogonal to the X-axis direction and the Y-axis direction is referred to as a Z-axis direction (positive Z-direction). The directions are suitably used while having the positive X-direction as the forward direction (negative X-direction as the rearward direction), the positive Y-direction as the left direction (negative Y-direction as the right direction), and the positive Z-direction as the upward direction (negative Z-direction as the downward direction).

Specifically, the timepiece assembly line 1000 of the present embodiment is a line in which a movement M (assembling object component) that becomes the contents of the timepiece is assembled. The timepiece assembling apparatus 1 is an apparatus which causes a component (the workpiece W) called a setting lever (FIG. 8) to be embedded in the movement M in the timepiece assembly line 1000. The setting lever is a component engaging with a shaft called a winding stem to which a crown is attached, fixing the winding stem, and playing a role as a changeover switch for the crown when the time is adjusted.

The timepiece assembling apparatus 1 is configured to have a picking device 20 including a workpiece supplying device 10, and a transportation unit 30 transporting the assembling object component in which the workpiece W is embedded. The workpiece supplying device 10 is an apparatus which transports the workpiece W and supplies the workpiece W to the picking device 20. The picking device 20 is an apparatus which performs operations of picking up the workpiece W supplied from the workpiece supplying device 10, moving the workpiece W to the movement M being conveyed in the timepiece assembly line 1000, and causing the workpiece W to be embedded in the movement M. The picking device 20 is installed in a form of interposing the transportation unit 30 which transports the movement M.

The workpiece supplying device 10 is configured to include a pallet 100 which transports the workpiece W and has a circular shape in a planar view, a vibration unit 120 which is installed below the pallet 100 and applies vibration to the pallet 100, and a supply hopper 130 which is installed above the pallet 100 and supplies the workpiece W to the pallet 100. Accordingly, the workpiece W supplied to the supply hopper 130 falls from a tip portion 1301 onto the pallet 100 due to vibration of the supply hopper 130. The fallen workpiece W is transported in the circumferential direction along the front surface of the pallet 100 due to vibration of the pallet 100. In the present embodiment, the workpiece W is transported counterclockwise in a case where the pallet 100 is viewed in the upward direction.

The picking device 20 is configured to include the above-described workpiece supplying device 10, a detection unit 200, a lighting portion 210 (FIG. 9), the pickup unit 220, and a circuit unit (not illustrated). The detection unit 200 detects a position and a posture of the workpiece W inside the pallet 100 in the workpiece supplying device 10. The lighting portion 210 is installed on the rear surface side of the pallet 100 and performs irradiation of light toward the pallet 100. The pickup unit 220 picks up the workpiece W, moves the workpiece W to a predetermined position of the movement M being conveyed in the timepiece assembly line 1000, and causes the workpiece W to be embedded in a predetermined position inside the movement M.

The circuit unit includes a control unit (not illustrated), which instructs the pickup unit 220 to pick up the workpiece W based on a detection result of the detection unit 200. Thereafter, the control unit also instructs the pickup unit 220 to perform embedment with respect to the movement M. When the embedment ends, in a case where there is still the workpiece W which can be picked up and remains in the pallet 100, the picking device 20 repeats operations of picking up and embedment again. The control unit is stored in a portion (not illustrated) of the picking device 20.

Figure 3:
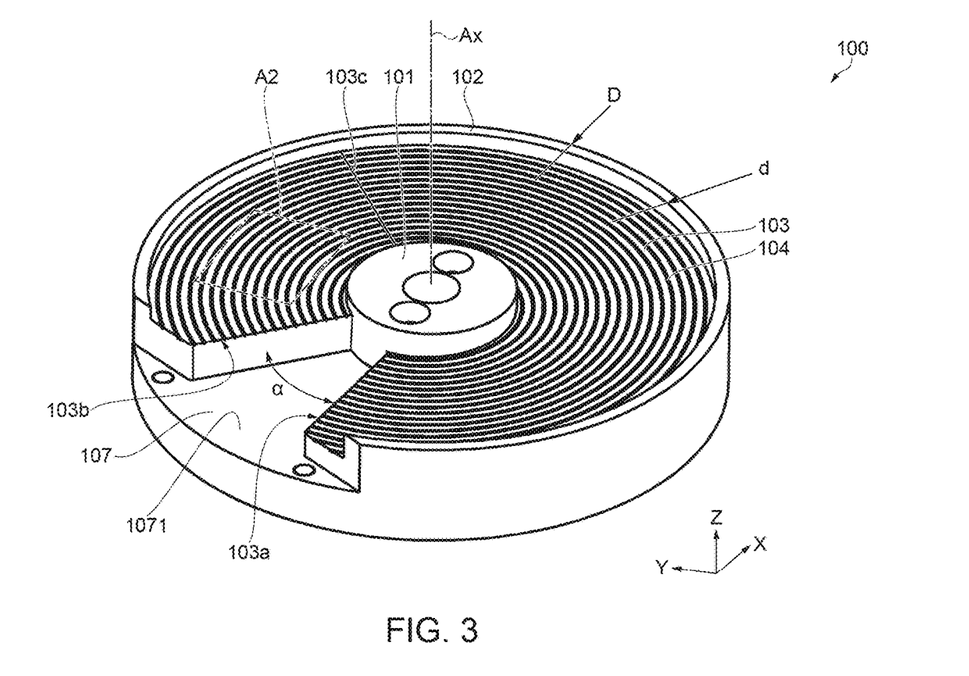
FIG. 3 is a view illustrating a cut-off portion of a pallet of a workpiece supplying device.
Figure 4:
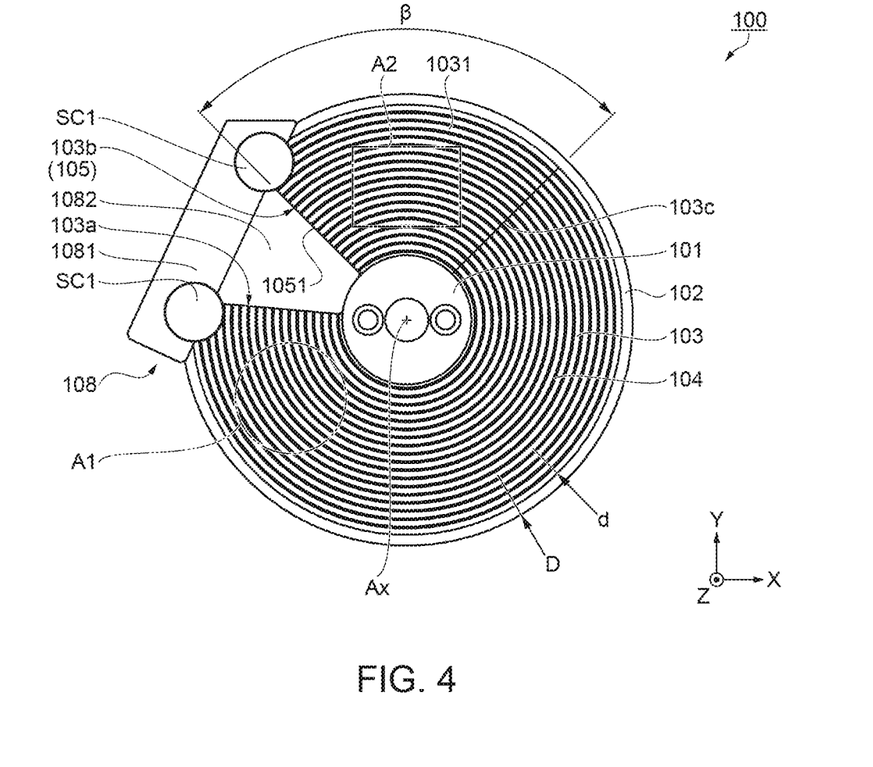
FIG. 4 is a plan view of the pallet (the pallet in which a cover is installed) viewed from above.
Figure 5:
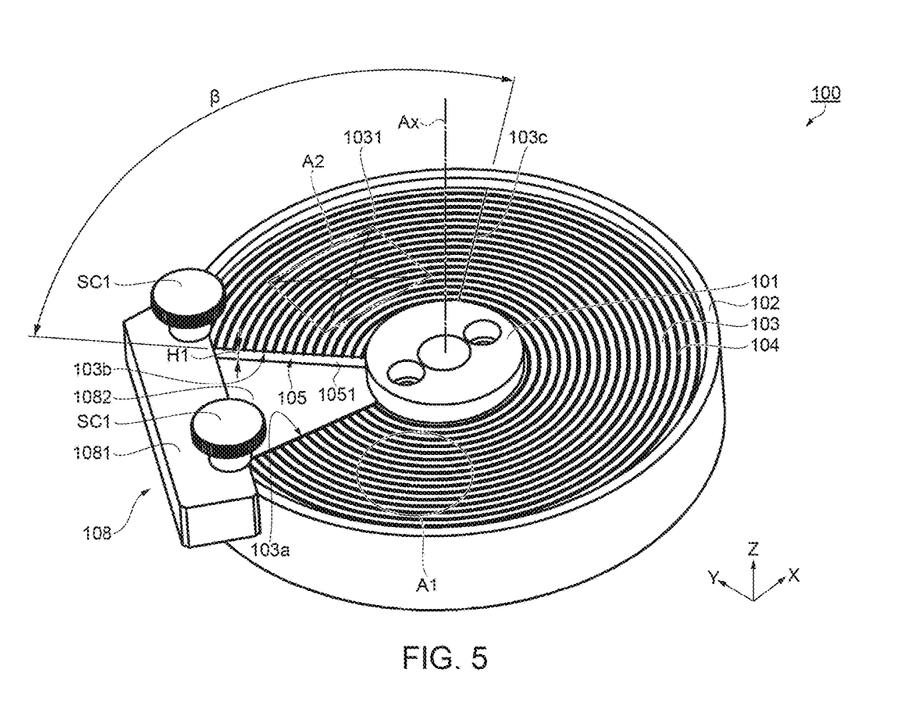
FIG. 5 is a perspective view illustrating the pallet.
Figure 6:
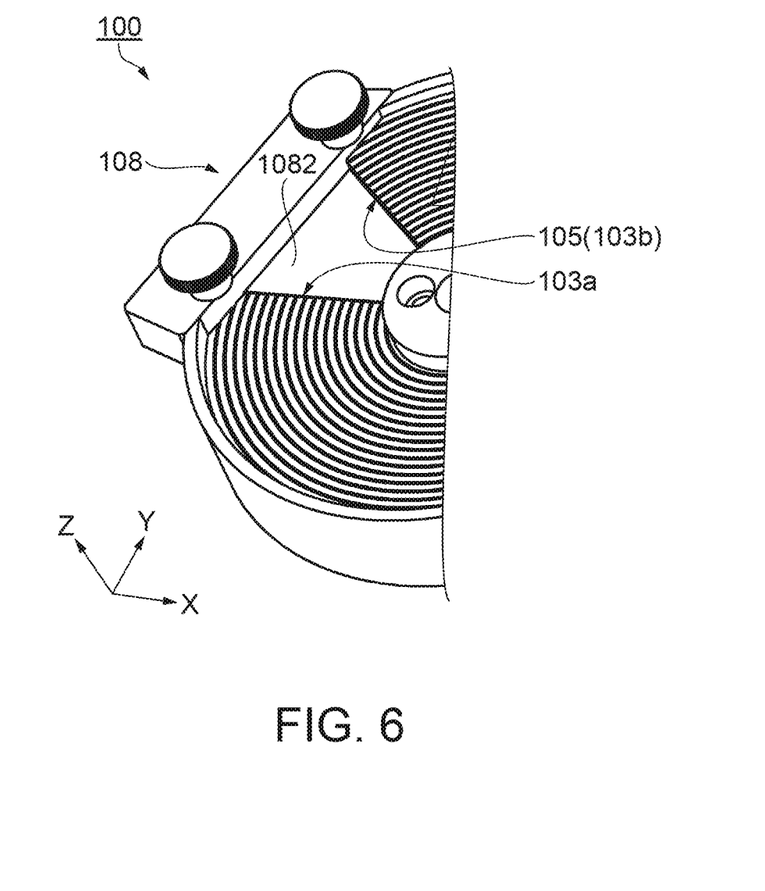
FIG. 6 is another perspective view illustrating the pallet.
Figure 7:
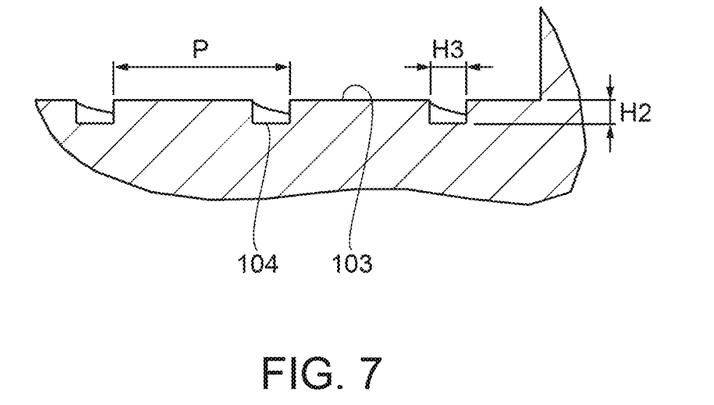
FIG. 7 is an enlarged cross-sectional view illustrating a groove portion.

FIG. 3 is a view illustrating a cut-off portion 107 of the pallet 100 of the workpiece supplying device 10. FIG. 4 is a plan view of the pallet 100 (the pallet 100 in which a cover 108 is installed) viewed from above. FIGS. 5 and 6 are perspective views illustrating the pallet 100. FIGS. 5 and 6 illustrate perspective views in states where the viewpoint is changed. FIG. 7 is an enlarged cross-sectional view illustrating groove portions 104. With reference to FIGS. 3 to 7, the configuration and the operation of the pallet 100 will be described.

As illustrated in FIGS. 3 to 5, the pallet 100 is formed to have a disk shape substantially centering around a central axis Ax. A cylindrical fixing portion 101 for fixing the pallet 100 to the vibration unit 120 which is installed below the pallet 100 is formed in a central portion of the pallet 100. An edge portion 102 configured to be positioned a step higher than a transportation surface portion 103 for transporting the workpiece W is formed in an outer circumferential portion of the pallet 100. The fixing portion 101 is also configured to have a height similar to that of the edge portion 102. Therefore, the transportation surface portion 103 is in a form of being interposed between the fixing portion 101 and the edge portion 102.

As illustrated in FIG. 3, the cut-off portion 107 is formed in a portion of the pallet 100. The cut-off portion 107 is widened at a predetermined angle α from the central axis Ax in the pallet 100. The outer circumferential portion is also partially cut off and is formed to have a cut-off surface portion 1071 which is positioned a step lower than the transportation surface portion 103.

Here, as illustrated in FIGS. 3 to 6, in the present embodiment, the transportation surface portion 103 is formed in a spiral state centering around the central axis Ax and having one round or less. Specifically, in a case where one end portion of the transportation surface portion 103 which is cut off due to the cut-off portion 107 is referred to as a leading end portion 103a, the other end portion is referred to as a trailing end portion 103b, and a portion returning clockwise from the trailing end portion 103*b* toward the leading end portion 103*a* by a predetermined angle β is referred to as a spiral trailing end portion 103*c*, the transportation surface portion 103 is formed in a so-called spiral state which gradually rises counterclockwise from the leading end portion 103*a* toward the spiral trailing end portion 103*c*. The transportation surface portion 103 from the spiral trailing end portion 103*c* to the extent of the trailing end portion 103*b* is formed to be a surface portion orthogonal to the central axis Ax. The surface portion is referred to as a flat surface portion 1031.

As illustrated in FIGS. 4 to 6, the cut-off portion 107 is blocked and the cover 108 is installed in the cut-off portion 107 of the pallet 100. The cover 108 is formed so as to cause the workpiece W to be transported to the blocked portion as well. Specifically, an outer shape configuration portion 1081 which configures the outer shape of the pallet 100, and a transportation assistance surface portion 1082 which is configured to be the transportation surface portion 103 are integrated and form the cover 108.

The transportation assistance surface portion 1082 of the cover 108 is formed in a spiral state similar to that of the transportation surface portion 103. Specifically, in a case where the cover 108 is installed in the cut-off portion 107, the spiral shape of the transportation surface portion 103 is also formed in the transportation assistance surface portion 1082 in a uniformly extending state. Accordingly, as illustrated in FIG. 5, a step difference is generated between the trailing end portion 103*b* of the transportation surface portion 103 and the transportation assistance surface portion 1082 of the cover 108. Hereinafter, the portion of the step difference will be referred to as a stepped portion 105. In the stepped portion 105, a side surface between the trailing end portion 103*b* of the transportation surface portion 103 and the transportation assistance surface portion 1082 of the cover 108 will be referred to as a stepped surface 1051 hereinafter. In other words, it is possible to mention that the stepped portion 105 includes the stepped surface 1051 intersecting the circumferential direction of the pallet 100.

The cover 108 is configured to be attachable/detachable with respect to the cut-off portion 107 and is fixed to the cut-off portion 107 by two screws SC1. The cover 108 is removed from the cut-off portion 107 in a case of switching the workpieces W to be transported to the pallet 100. A member (not illustrated) is installed in the cut-off portion 107, and the workpieces W which have been transported thus far are collected in the member. After the member is removed from the cut-off portion 107, the cover 108 is installed in the cut-off portion 107 again. Thereafter, workpieces W to be newly transported are input in the pallet 100.

A plurality of the groove portions 104 are formed in the transportation surface portion 103 of the pallet 100 in a concentric manner centering around the central axis Ax. Even though there is a protrusion on the outer surface of the workpiece W to be transported, the groove portions 104 serve as portions which restrain the workpiece W such that the posture of the workpiece W becomes a desired posture in the transportation surface portion 103, by guiding (leading) the protrusion into the groove portion 104. When the protrusion of the workpiece W is guided into the groove portion 104, the workpiece W is mounted on the transportation surface portion 103 in the desired posture, thereby being transported. In the present embodiment, as illustrated in FIGS. 4 and 7, eighteen groove portions 104 in total are formed at equal pitches P. No groove portion is formed in the transportation assistance surface portion 1082 of the cover 108 transporting the workpiece W.

In the present embodiment, the desired posture is a posture in which the pickup unit 220 can properly and reliably pick up the workpiece W. The detailed description will be given later. However, the desired posture indicates a posture in which the front surface of the workpiece W to be picked up is substantially parallel to the transportation surface portion 103 and is oriented in the upward direction. In other words, the protrusion of the workpiece W is guided into the groove portion 104, and the rear surface thereof comes into contact with the transportation surface portion 103.

Here, the dimension value of each portion in the pallet 100 will be described. The workpiece W described below is considered to be the workpiece W including the setting lever and timepiece assembly components other than the setting lever. The pallet 100 of the present embodiment is also configured to be able to be used for transporting the setting lever and the components other than the setting lever.

As illustrated in FIGS. 3 and 4, an outer shape D of the pallet 100 measures φ 210 mm, which is the maximum outer shape of the pallet allowed in the vibration unit 120. An inner diameter d of the pallet 100 measures φ 200 mm, which is equal to ten times or greater than the outer shape dimensions (on the assumption that the maximum outer shape dimensions of the workpiece W measures 17 mm) of the workpiece W to be transported. As illustrated in FIG. 5, a step difference H1 of the stepped portion 105 measures 4 mm, which is equal to or greater than the minimum outer shape dimensions (on the assumption that the minimum outer shape dimensions of the workpiece W measures 4 mm) of the workpiece W.

As illustrated in FIG. 7, a depth H2 of each groove portion 104 measures 0.5 mm, and the height of the greatest protrusion of the workpiece W is assumed to measure 0.3 mm. A width H3 of each groove portion 104 measures 0.8 mm, and the diameter of the greatest protrusion of the workpiece W is assumed to measure 0.5 mm. The pitch P of the groove portions 104 measures 3.8 mm, which is set within a range from one time to two times the maximum dimensions of the outer shape of the workpiece W including a portion (projection portion) of the workpiece W which is guided into the groove portion 104.

The pallet 100, excluding the cover 108, is configured to have light-transmitting characteristics. In the present embodiment, the pallet 100 is configured to be made from a synthetic resin material having light-transmitting characteristics (in the present embodiment, a polycarbonate resin having light-transmitting characteristics). The cover 108 is configured to be made from a synthetic resin material having no light-transmitting characteristics.

Figure 8:
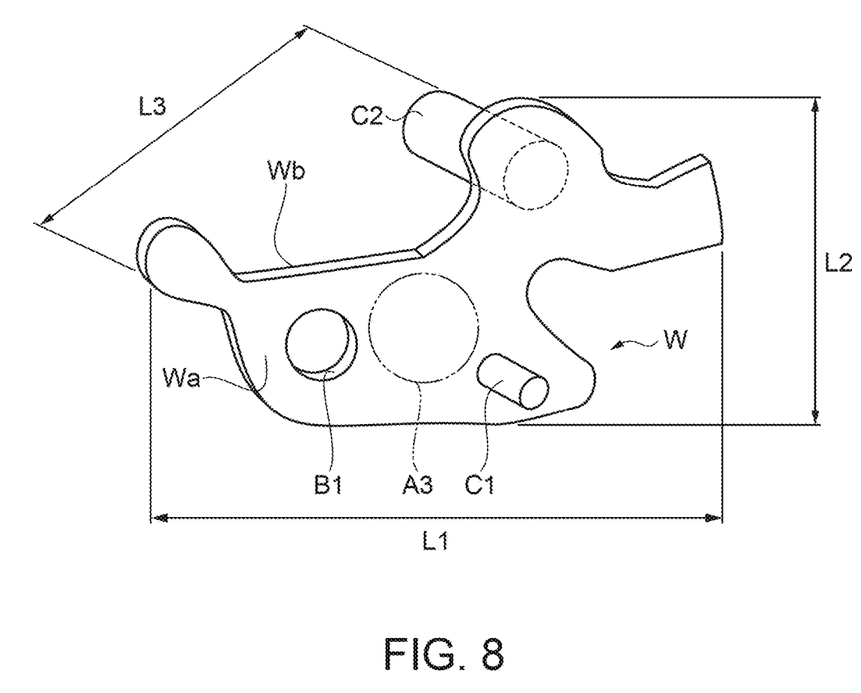
FIG. 8 is a perspective view illustrating a schematic shape of a workpiece.

FIG. 8 is a perspective view illustrating a schematic shape of the workpiece W. With reference to FIG. 8, description will be given regarding the shape of the setting lever which is the workpiece W of the present embodiment.

The workpiece supplying device 10 of the present embodiment supplies the setting lever as the workpiece W which is an assembly component of a timepiece. As illustrated in FIG. 8, the setting lever (hereinafter, will be referred to as the workpiece W) is formed to have the plate-like outer shape which is diversely indented. A penetrating hole portion B1 is formed in the workpiece W. A protrusion C1 protruding in a cylindrical manner is formed on a front surface Wa of the workpiece W, and a protrusion C2 protruding in a similarly cylindrical manner is formed on a rear surface Wb.

Dimensional relationships of the workpiece W (setting lever) illustrated in FIG. 8 will be schematically described.

The height of the protrusion C1 of the workpiece W from the front surface Wa measures 0.3 mm. The height of the protrusion C2 from the rear surface Wb also measures 0.3 mm. The diameter of the protrusion C1 measures 0.3 mm, and the diameter of the protrusion C2 measures 0.4 mm. In the outer shape of the workpiece W, a length L1 in the longitudinal direction measures 5 mm, and a length L2 in the short direction (minimum outer shape) measures 2.5 mm.

In a case where the workpiece W formed as described above is mounted in the transportation surface portion 103, even if any surface of both sides (the front surface Wa and the rear surface Wb) of the workpiece W faces the transportation surface portion 103 side, the protrusion C1 or C2 comes into contact with the transportation surface portion 103 and the workpiece W tilts. Accordingly, the workpiece W cannot be stably mounted. Therefore, in the present embodiment, the protrusion C2 on the rear surface Wb side is guided into the groove portion 104 for the purpose of causing the rear surface Wb to be in a posture of being brought into contact with the transportation surface portion 103 (a posture in which the front surface Wa is oriented in the upward direction). The above-described posture becomes the desired posture.

In a case where the workpiece W is in the desired posture, the below-described picking device 20 can pick up the workpiece W. In addition, the picking device 20 can perform embedment of the workpiece W with respect to the movement M at a movement destination after being picked up. In the present embodiment, the picking device 20 picks up the workpiece W through a portion on the surface of a pickup region A3 which is set on the front surface Wa. Specifically, in the present embodiment, the picking device 20 performs a pickup operation through suctioning.

Subsequently, description will be given regarding transportation of the workpieces W in the workpiece supplying device 10.

First, as illustrated in FIGS. 1 and 2, the workpieces W are supplied to the supply hopper 130. The supply is performed by a worker. The workpieces W supplied to the supply hopper 130 are input to the pallet 100 by falling from the tip portion 1301 onto the pallet 100 positioned below the tip portion 1301, due to vibration of the supply hopper 130. Specifically, as illustrated in FIGS. 4 and 5, the workpieces W are input to an input region A1 which becomes a portion slightly moving counterclockwise from the leading end portion 103a of the transportation surface portion 103 of the pallet 100.

The workpieces W input to the input region A1 begin to be transported counterclockwise toward the trailing end portion 103b in the transportation surface portion 103 of the pallet 100 due to vibration of the vibration unit 120. In the present embodiment, an electromagnetic type adopting an electromagnet is employed as the vibration unit 120. A piezoelectric type adopting a piezoelectric element, or the like may be employed as the vibration unit 120.

While the workpiece W moves in the transportation surface portion 103, there are cases where the protrusion C2 is guided into the groove portion 104 so that the workpiece W moves in a posture in which the rear surface Wb is in contact with the transportation surface portion 103 (the desired posture) and cases where the workpiece W moves not in the desired posture. In a case where the workpiece W passes through the spiral trailing end portion 103c of the transportation surface portion 103, the transportation surface portion 103 moves not on a surface which is inclined in a spiral state but in the flat surface portion 1031 which has a flat surface (a surface orthogonal to the central axis Ax).

In the present embodiment, a region where the below-described picking device 20 performs picking up is set in a region from the spiral trailing end portion 103c to the trailing end portion 103b of the transportation surface portion 103. Specifically, as illustrated in FIGS. 3 to 5, among the workpieces W, the workpiece W in the desired posture is picked up in a visual angle region A2 which is a substantially rectangular region.

The workpiece W not positioned within the visual angle region A2 or the workpiece W positioned within the visual angle region A2 but not in the desired posture moves in the flat surface portion 1031 and arrives at the trailing end portion 103b. The workpiece W still moves thereafter, and the workpiece W falls from the stepped portion 105 formed in the trailing end portion 103b onto the transportation assistance surface portion 1082 of the cover 108. The workpiece W which falls onto the transportation assistance surface portion 1082 moves in the transportation assistance surface portion 1082 and arrives at the leading end portion 103a. Thereafter, the workpiece W repeats movement again.

As described above, a course of transporting the workpiece W in the pallet 100 of the workpiece supplying device 10 corresponds to a transportation process in a picking method. The picking method of the present embodiment includes the transportation process, a detection process, and a pickup process. The detection process and the pickup process will be sequentially described hereinafter.

The pitch P of the groove portions 104 measures 3.8 mm. In the present embodiment, the pitch P thereof is set to one time the maximum dimensions (L3) to the extent of the outer shape of the workpiece W including the protrusion C2 of the workpiece W guided into the groove portion 104. Accordingly, even in a case where the protrusions C2 of the workpieces W are respectively guided into the groove portion 104 and an adjacent groove portion 104, transportation of the workpiece W and the different workpiece W in an overlapping state is reduced as much as possible. Moreover, separation of the workpieces W from the groove portion 104 caused by mutual collision of the workpieces W, and the like is reduced. Thus, stable transportation is conducted.

The step difference H1 of the stepped portion 105 measures 4 mm, and the minimum outer shape dimensions (L2) of the workpiece W of the present embodiment measures 2.5 mm. Accordingly, the probability of the posture of the workpiece W being in the desired posture (the posture in which the protrusion C2 is guided into the groove portion 104) through successive transportation is improved by causing the workpiece W that has not been picked up to fall from the stepped portion 105.

Subsequently, the configuration and the operation of the picking device 20 will be described.

The picking device 20 of the present embodiment is configured to include the above-described workpiece supplying device 10, the detection unit 200, the lighting portion 210, the pickup unit 220, and the circuit unit (not illustrated) including the control unit. As illustrated in FIGS. 1 and 2, the detection unit 200 detects the position and the posture of the workpiece W inside the pallet 100 in the workpiece supplying device 10. The detection unit 200 includes an image-capturing unit 201 which acquires image data of the workpiece W inside the pallet 100. The image-capturing unit 201 is configured to be a camera adopting a charge coupled device (CCD). The detection unit 200 is installed above the flat surface portion 1031 of the pallet 100 and captures an image within the visual angle region A2 which is set in the flat surface portion 1031.

Figure 9:
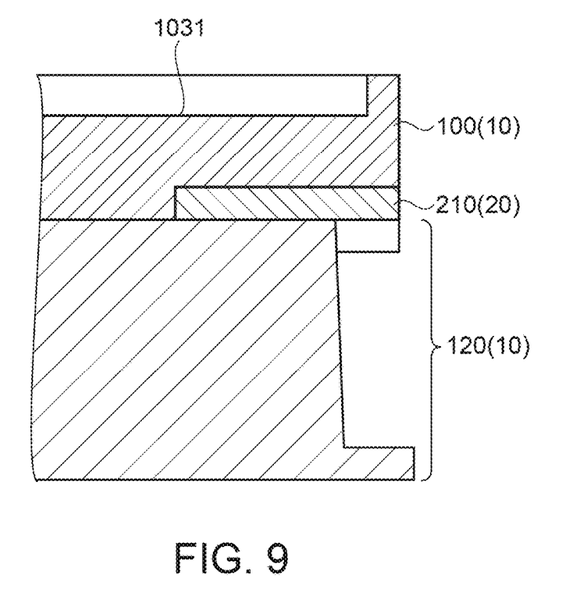
FIG. 9 is a schematic side sectional view illustrating a lighting portion.

FIG. 9 is a schematic side sectional view illustrating the lighting portion 210. With reference to FIG. 9, the configuration and the operation of the lighting portion 210 will be described.

The picking device 20 includes the lighting portion 210 which assists image-capturing performed by the detection unit 200. As illustrated in FIG. 9, the lighting portion 210 is configured to have a flat plate shape and is installed on the rear surface side of the pallet 100 where the pallet 100 is partially cut off. Specifically, the lighting portion 210 is installed at a cut-off place of the rear surface side of the pallet 100 which is positioned toward the downward direction of the flat surface portion 1031 of the pallet 100. The lighting portion 210 is configured to adopt a light emitting diode (LED). The lighting portion 210 performs irradiation of light toward the pallet 100 positioned thereabove.

The pallet 100 is configured to have light-transmitting characteristics as described above and transmits light from the lighting portion 210. Particularly, the flat surface portion 1031 facing the lighting portion 210 maximally transmits light. However, in the present embodiment, the pallet 100 in its entirety transmits light as well. In contrast, since the workpiece W inside the pallet 100 is configured to be made from metal in the present embodiment, the workpiece W blocks light which has been transmitted through the pallet 100 (the transportation surface portion 103). Accordingly, in a case where the image-capturing unit 201 captures an image of the visual angle region A2, the contrast ratio of the workpiece W and the pallet 100 can be improved, and thus, the image of the position (shape) or the posture of the workpiece W can be clearly captured.

Figure 10:
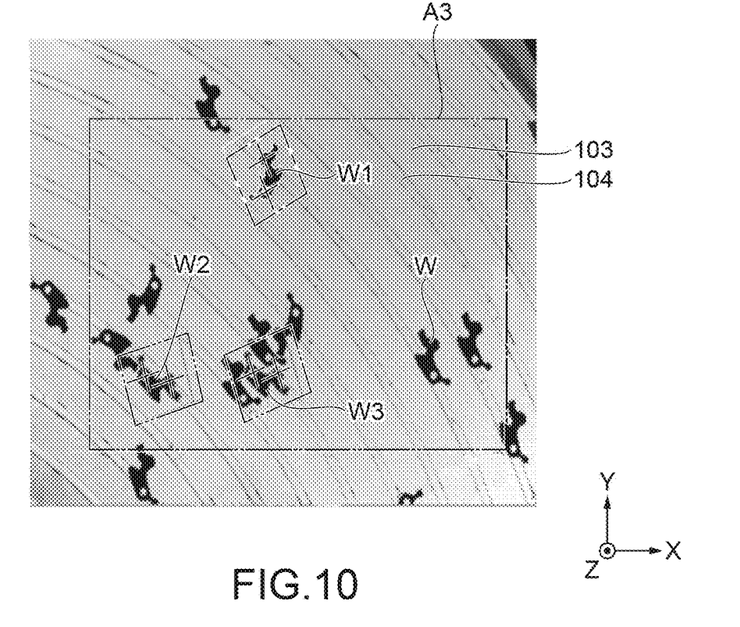
FIG. 10 is a view illustrating an image of a visual angle region captured by a detection unit (image-capturing unit).

FIG. 10 is a view illustrating an image of the visual angle region A2 captured by the detection unit 200 (image-capturing unit 201). With reference to FIG. 10, the operation of the control unit will be described.

The control unit analyzes (performs image processing) an image as a detection result from the detection unit 200 and selects the workpiece W whose protrusion C2 is guided into the groove portion 104 and whose front surface Wa is oriented in the upward direction. FIG. 10 illustrates a state where three workpieces W such as workpieces W1, W2, and W3 are selected as the workpieces W in the desired postures (the workpieces W which become pickup targets) as a result after the control unit has performed the image processing. The workpiece W whose protrusion C1 on the front surface Wa of the workpiece W is guided into the groove portion 104 and whose rear surface Wb is oriented in the upward direction is not selected as the pickup target through the image processing performed by the control unit, even though the posture thereof is not inclined and is stable.

In a case where the detection unit 200 captures an image of the workpiece W, the control unit issues an instruction to stop transportation of the workpiece W performed by the pallet 100 (stopping vibration of the vibration unit 120). A period in which the workpiece W stops being transported becomes a period from the time when the image is captured to the time when the last workpiece W that has been selected is picked up. In a case where the pickup period elapses (the last workpiece W is picked up), the control unit issues an instruction again to drive the vibration unit 120 so as to vibrate the pallet 100. Accordingly, when the vibration unit 120 starts to vibrate, the pallet 100 restarts transportation of the workpieces W. In this manner, in the present embodiment, the control unit causes the vibration unit 120 to be intermittently driven.

In a case where the workpieces W (the workpieces W1, W2, and W3) which become the pickup targets are selected through the image processing, the control unit thereafter outputs an instruction to the pickup unit 220 so as to pick up the target workpieces W1, W2, and W3. The pickup unit 220 starts the pickup operation upon the instruction received from the control unit.

As described above, an operation in which an image of the workpiece W that is transported through the transportation process is captured by the detection unit 200 (image-capturing unit 201) of the picking device 20, and the workpiece W that becomes the pickup target is selected by the control unit based on the image-captured data through the image processing corresponds to the detection process in the picking method. As described above, the image-capturing unit 201 captures an image of workpiece W which is transported to the visual angle region A2 of the pallet 100.

As illustrated in FIGS. 1 and 2, the pickup unit 220 is configured to be a horizontally articulated robot (so-called SCARA robot). The pickup unit 220 is configured to include a first arm 221, a second arm 222, and a pickup shaft 223 which is movably installed inside the second arm 222. The pickup unit 220 moves in an X-direction and a Y-direction by using the first arm 221 and the second arm 222 and moves in a Z-direction by using the shaft 223. In the present embodiment, the pickup unit 220 (particularly, the second arm 222) is movably installed between the pallet 100 and the image-capturing unit 201.

In a case where the pickup unit 220 receives an instruction from the control unit so as to pick up the workpiece W1, the pickup unit 220 drives the first arm 221 and the second arm 222 based on positional data of the workpiece W1 in the pickup region A3 instructed by the control unit, and the pickup unit 220 causes the shaft 223 to be positioned above the pickup region A3. Thereafter, the shaft 223 moves downward, and the workpiece W1 is picked up by using a picking tool (not illustrated) which is installed in the tip portion of the shaft 223. In the present embodiment, picking-up is performed through adsorption adopting air.

After picking up the workpiece W1, the pickup unit 220 subsequently executes an operation which is stored through teaching. Specifically, the pickup unit 220 moves the picked-up workpiece W1 to a place above the movement M. Subsequently, the shaft 223 is lowered, thereby performing an embedment operation by plunging the workpiece W1 into the movement M at a predetermined position. In this manner, the operations from when the pickup unit 220 picks up the workpiece W until when the workpiece W is embedded in the movement M become a series of operations.

In a case where the series of operations end, the pickup unit 220 thereafter repeats the series of operations with respect to the workpieces W2 and W3 in a manner similar to that described above. The pickup unit 220 picks up the last workpiece W3 and causes the last workpiece W3 to be embedded in the movement M, thereby ending the current operation. The pickup unit 220 stands by in a predetermined position until the next instruction is received from the control unit. In a case where set conditions are satisfied (in the present embodiment, after the lapse of a predetermined time) the control unit outputs an instruction to the detection unit 200 so as to capture an image. Thereafter, the control unit performs controlling similar to that described above.

A cycle time of the timepiece assembly line 1000 of the present embodiment is set to 2.5 seconds. The timepiece assembling apparatus 1 of the present embodiment is operated under the cycle time less than 2.5 seconds, thereby catching up the delay occurring in other processes in the timepiece assembly line 1000.

As described above, an operation of causing the pickup unit 220 to pick up the workpiece W detected through the detection process corresponds to the pickup process in the picking method. As described above, picking is performed with respect to the workpiece W which has become the pickup target through an analysis of the image performed by the control unit.

According to the above-described embodiment, the below-described effects can be obtained.

According to the workpiece supplying device 10 of the present embodiment, in a case where the shape of the workpiece W is a shape in which the protrusion C2 is present on the rear surface Wb and the workpiece W tilts when being placed on a plane surface, the protrusion C2 which is a factor of the tilting is guided into the groove portion 104 disposed on the front surface of the pallet 100 in an arc state. Therefore, the workpiece W can be supplied such that the posture thereof becomes the desired posture. The workpiece W which is not guided into the groove portion 104 (the workpiece W which is not in the desired posture) is caused to fall from the stepped portion 105 having the stepped surface 1051 intersecting the circumferential direction of the pallet 100. Thus, it is possible to improve the probability of being in the desired posture by causing the position of the workpiece W to be transported so as to deviate from that of the previous transportation, turning the workpiece W upside down, and the like.

According to the workpiece supplying device 10 of the present embodiment, since the plurality of groove portions 104 are disposed in a concentric manner, the number of the workpieces W in the desired postures can be efficiently increased with respect to the workpieces W having the shapes in which the workpieces W tilt when being placed on a plane surface. When the number of the workpieces W guided into the groove portions 104 increases, separation of the workpieces W from the groove portion 104 caused by mutual collision of the workpieces W, and the like is reduced. Thus, stable transportation can be conducted.

According to the workpiece supplying device 10 of the present embodiment, the flat surface portion 1031 which becomes a surface portion orthogonal to the central axis Ax of the pallet 100 is included in the vicinity of the stepped portion 105. Therefore, in a case where the workpiece W which is guided into the groove portion 104 and is in the desired posture is positioned in the flat surface portion 1031, the picking device 20 (the pickup unit 220) can pick up the workpiece W. Accordingly, compared to a case where picking-up is performed in the transportation surface portion 103 in a spiral state (intersecting the central axis Ax in an inclined manner) other than the flat surface portion 1031, the workpiece can be accurately picked up in a stable posture.

According to the workpiece supplying device 10 of the present embodiment, in the pallet 100, when irradiation of light is performed from below the pallet 100, there are cases where the light is entirely transmitted due to light-transmitting characteristics thereof, and there are cases where the light is blocked by the workpiece W. Accordingly, the position (shape) or the posture of the workpiece W can be clarified.

According to the workpiece supplying device 10 of the present embodiment, the pallet 100 is configured to include a synthetic resin material (in the present embodiment, a polycarbonate resin) having light-transmitting characteristics. Thus, the pallet 100 having light-transmitting characteristics can be easily formed.

According to the picking device 20 of the present embodiment, with respect to the workpieces W supplied by the workpiece supplying device 10, the workpiece W can be easily and accurately picked up by the pickup unit 220 due to the detection of the position and the posture of the workpiece W performed by the detection unit 200, and the instruction issued to the pickup unit 220 by the control unit based on the detection result of the detection unit 200.

According to the picking device 20 of the present embodiment, when the lighting portion 210 included on the rear surface side of the pallet 100 irradiates the pallet 100 with light, the light can be transmitted due to light-transmitting characteristics which the pallet 100 has. Accordingly, since the contrast between the workpiece W and the surroundings can be improved, in a case where the detection unit 200 includes the image-capturing unit 201 which acquires the image data of the workpiece W, image-capturing can be performed at a high contrast, and detection of the position and the posture of the workpiece W can be more accurately performed.

According to the timepiece assembling apparatus 1 of the present embodiment, including the workpiece supplying device 10 supplying the workpiece W which is necessary to assemble a timepiece such that the posture of the workpiece W is in the desired posture, since there is provided the picking device 20 which accurately picks up the supplied workpiece W, the timepiece can be accurately assembled, and thus, improvement of the cycle time can be realized.

According to the picking method of the present embodiment, the groove portions 104 of the workpiece supplying device 10 are set to have the pitch P within a range from one time to two times the maximum dimensions of the outer shape of the workpiece W including the protrusion C2 which is guided into the groove portion 104. Accordingly, in the transportation process of the workpiece supplying device 10, even in a case where the protrusions C2 of the workpieces W are respectively guided into the groove portion 104 and an adjacent groove portion 104, transportation of the workpiece W and the different workpiece W in an overlapping state is reduced as much as possible. Moreover, separation of the workpieces W from the groove portion 104 caused by mutual collision of the workpieces W, and the like is reduced. Thus, stable transportation is conducted. In addition, it is possible to perform efficient transportation without generating useless space.

Without being limited to the above-described embodiment, the invention can be executed by applying various changes, improvements, and the like without departing from the gist and the scope thereof. Modification examples will be described below.

The timepiece assembling apparatus 1 of the embodiment is an apparatus causing the setting lever as the workpiece W which is a timepiece assembling component to be embedded in the movement M. However, without being limited thereto, the workpiece W can be applied as long as the workpiece W is a component which has the protrusion, the protrusion of which is guided into the groove portion, and then, which can be transported.

In the workpiece supplying device 10 of the embodiment, no groove portion is formed in the transportation assistance surface portion 1082 of the cover 108 in which the workpiece W is transported. However, without being limited thereto, the transportation assistance surface portion 1082 may also include the groove portions leading to the groove portions 104 of the transportation surface portion 103.

The workpiece supplying device 10 of the embodiment copes with multiple types of the workpieces W by installing the cover 108 in the pallet 100 in an attachable/detachable manner, and thus, general-purpose properties of the workpiece supplying device 10 are improved. However, without being limited thereto, in a case where the apparatus may be a dedicated workpiece supplying device which transports designated workpieces W, a portion of the cover 108 may be caused to serve as the transportation surface portion, without installing the cover 108.

In the workpiece supplying device 10 of the embodiment, the pallet 100 in its entirety excluding the cover 108 may be formed to have light-transmitting characteristics. However, without being limited thereto, the portion having light-transmitting characteristics may be a portion corresponding to at least the region in which an image of the workpiece W is captured. In the present embodiment, a portion corresponding to the visual angle region A2 may have light-transmitting characteristics.

In the workpiece supplying device 10 of the embodiment, the pallet 100 is formed from a synthetic resin material having light-transmitting characteristics. However, without being limited thereto, the pallet 100 may be formed to include a glass material having light-transmitting characteristics.

In the picking device 20 of the embodiment, the lighting portion 210 is not limited to the LED and may be configured to adopt other types of light-emitting means such as a cold cathode tube, an organic electroluminescence (EL), and the like.

The entire disclosure of Japanese Patent Application No. 2015-138481, filed Jul. 10, 2015 is expressly incorporated by reference herein.

What is claimed is:

1. A workpiece supplying device comprising:
a pallet that has a plurality of grooves and a step, each of the plurality of grooves being disposed in an arc state in the pallet, the step including a stepped surface intersecting a circumferential direction of the pallet, the pallet accommodating a workpiece; and
a vibrator that is provided adjacent to the pallet and that applies vibration to the pallet,
wherein the plurality of grooves are disposed in a concentric manner.

2. The workpiece supplying device according to claim 1, wherein the pallet is disk-shaped and has a central axis, the pallet includes a plurality of planer surfaces orthogonal to the central axis of the pallet, and
the plurality of planer surfaces and the plurality of grooves are alternately provided in the pallet.

3. The workpiece supplying device according to claim 1, wherein the pallet includes a portion having light-transmitting characteristics.

4. The workpiece supplying device according to claim 3, wherein the portion having light-transmitting characteristics includes a synthetic resin or glass.

5. A picking device comprising:
the workpiece supplying device according to claim 1;
a detector that detects a position and a posture of the workpiece accommodated by the pallet;
a pickup member that picks up the workpiece; and
a controller that is configured to output an instruction causing the pickup member to pick up the workpiece based on a detection result from the detector.

6. The picking device according to claim 5, further comprising:
a lighting device that irradiates the pallet with light, the lighting device being provided on a rear surface side of the pallet opposite to a surface on which the plurality of grooves are disposed.

7. A timepiece assembling apparatus comprising:
the picking device according to claim 5; and
a transportation member that transports an assembling object component in which the workpiece picked up by the picking device is embedded.

8. A picking method comprising:
preparing a workpiece which has a projection and a workpiece supplying device which includes a pallet accommodating the workpiece, a groove being disposed on a front surface side of the pallet in an arc state, a step having a stepped surface intersecting a circumferential direction of the pallet, and a vibrator applying vibration to the pallet;
transporting the workpiece by using the workpiece supplying device;
detecting the workpiece which is transported in the transportation process, by using a detector; and
picking up the workpiece which is detected in the detection process by using a pickup member.

9. A workpiece supplying device comprising:
a pallet that has a groove and a step, the groove being disposed in an arc state in the pallet, the step including a stepped surface intersecting a circumferential direction of the pallet, the pallet accommodating a workpiece; and
a vibrator that is provided adjacent to the pallet and that applies vibration to the pallet,
wherein the pallet includes a portion having light-transmitting characteristics.

10. The workpiece supplying device according to claim 9, wherein the portion having light-transmitting characteristics includes a synthetic resin or glass.

11. The workpiece supplying device according to claim 9, wherein the groove is configured with a plurality of grooves, and
the plurality of grooves are disposed in a concentric manner in the pallet.

12. The workpiece supplying device according to claim 11, wherein the pallet is disk-shaped and has a central axis, the pallet includes a plurality of planer surfaces orthogonal to the central axis of the pallet, and
the plurality of planer surfaces and the plurality of grooves are alternately provided in the pallet.

13. A picking device comprising:
the workpiece supplying device according to claim 9;
a detector that detects a position and a posture of the workpiece accommodated by the pallet;
a pickup member that picks up the workpiece; and
a controller that is configured to output an instruction causing the pickup member to pick up the workpiece based on a detection result from the detector.

14. The picking device according to claim 13, further comprising:
a lighting device that irradiates the pallet with light, the lighting device being provided on a rear surface side of the pallet opposite to a surface on which the groove is disposed.

15. A timepiece assembling apparatus comprising:
the picking device according to claim 13; and
a transportation member that transports an assembling object component in which the workpiece picked up by the picking device is embedded.

* * * * *